(12) United States Patent
Katayama et al.

(10) Patent No.: US 8,978,597 B2
(45) Date of Patent: Mar. 17, 2015

(54) COOLING SYSTEM

(75) Inventors: Masaaki Katayama, Susono (JP); Daisaku Sawada, Gotenba (JP); Satoshi Komori, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/581,492

(22) PCT Filed: Feb. 10, 2011

(86) PCT No.: PCT/JP2011/052854
§ 371 (c)(1),
(2), (4) Date: Aug. 28, 2012

(87) PCT Pub. No.: WO2012/108030
PCT Pub. Date: Aug. 16, 2012

(65) Prior Publication Data
US 2013/0306004 A1 Nov. 21, 2013

(51) Int. Cl.
*F01P 7/14* (2006.01)
*F01P 3/00* (2006.01)
(Continued)

(52) U.S. Cl.
CPC ... *F01P 3/00* (2013.01); *F02G 5/04* (2013.01); *F01P 7/165* (2013.01); *F01P 2007/146* (2013.01); *F01P 7/16* (2013.01); *F01P 7/167* (2013.01); *F01P 2025/62* (2013.01); *F01P 2060/08* (2013.01); *F02G 2260/00* (2013.01); *Y02T 10/166* (2013.01)
USPC ........................................................ 123/41.1

(58) Field of Classification Search
CPC ....... F01P 7/16; F01P 7/167; F01P 2007/146; F01P 2060/08; F01P 2025/62
USPC ........................................................ 123/41.1
See application file for complete search history.

(56) References Cited

U.S. PATENT DOCUMENTS 4,057,040 A * 11/1977 Wax ............................ 123/46 R
(Continued)

FOREIGN PATENT DOCUMENTS

JP 2000-73763 3/2000
(Continued)

OTHER PUBLICATIONS

International Search Report in International Application No. PCT/JP2011/052854; Mailing Date: May 10, 2011.

*Primary Examiner* — Lindsay Low
*Assistant Examiner* — Charles Brauch
(74) *Attorney, Agent, or Firm* — Finnegan, Henderson, Farabow, Garrett & Dunner, LLP (57) ABSTRACT

A cooling system 1A includes an internal combustion engine 10, a pump 31, a radiator 32, a main passage section 41, a stirling engine 20, a branch passage section 43 branching from the main passage section 41 at a first connection point P1 and joining a downstream part of the main passage section 41 from the first connection point P1 at a second connection point P2, and a thermostat 33. The first connection point P1 and the second connection point P2 are provided in a part of the main passage section 41 between the radiator 32 and the pump 31. The thermostat 33 is provided in another part of the main passage section 41 between the first connection point P1 and the second connection point P2.

5 Claims, 4 Drawing Sheets (51) Int. Cl.
*F02G 5/04* (2006.01)
*F01P 7/16* (2006.01)

(56) References Cited

U.S. PATENT DOCUMENTS

2008/0104934 A1 5/2008 Morin
2009/0139686 A1 6/2009 Suzuki
2011/0174243 A1* 7/2011 Adam et al. ............... 123/41.1

FOREIGN PATENT DOCUMENTS

| | | |
|---|---|---|
| JP | 2005-90376 | 4/2005 |
| JP | 2005-248932 | 9/2005 |
| JP | 2007-120312 | 5/2007 |
| JP | 2008-51062 | 3/2008 |
| JP | 2010-526252 | 7/2010 |

* cited by examiner

COOLING SYSTEM

CROSS-REFERENCE TO RELATED APPLICATIONS

This application is a national phase application of International Application No. PCT/JP2011/052854, filed Feb. 10, 2011, the content of which is incorporated herein by reference.

TECHNICAL FIELD

The present invention relates to a cooling system, and more particularly, to a cooling system equipped with an internal combustion engine and a stirling engine.

BACKGROUND ART

There is known an art of passing a common cooling medium through an internal combustion engine and a stirling engine. Patent Document 1 discloses a power unit equipped with a water-cooled internal combustion engine having a cooling circuit, and a stirling engine having a cooling device that cools a working gas by a coolant that circulates through the cooling circuit. Further, patent Documents 2 through 4 disclose arts that are considered as being relative to the present invention in terms of structure.

PRIOR ART DOCUMENTS

Patent Documents

Patent Document 1: Japanese Patent Application Publication No. 2005-90376
Patent Document 2: Japanese Patent Application Publication No. 2007-120312
Patent Document 3: Japanese Patent Application Publication No. 2005-248932
Patent Document 4: Japanese Patent Application Publication No. 2000-73763

SUMMARY OF THE INVENTION

Problems to be Solved by the Invention

In the case where the common cooling medium is passed through the internal combustion engine and the stirling engine, a pump for pumping the coolant medium and a radiator that cools the cooling medium may be shared. This may realize an advantageous structure from the viewpoint of cost. The passage of the common cooling medium may be realized by providing a branch passage section that branches from a main passage section through which the coolant is passed and then joins the main passage section and by arranging the stirling engine in the branch passage section.

However, in this case, the coolant has a difficulty in passing through the branch passage section in a case where a part of the main passage section located after the branch passage section branches from the main passage section and before the branch passage section joins the main passage section has a small flow resistance to the coolant. Thus, the effective cooling of the stirling engine may not be ensured. In the stirling engine, larger power is available as the temperature difference between the low-temperature heat source and the high-temperature heat source is larger. However, it is not always easy to extract large power. Therefore, it is desirable to pass the cooling medium as cool as possible through the stirling engine in order to ensure the effective cooling. From these viewpoints, it is desirable to provide an art of capable of passing the cooling medium common to the internal combustion engine and the stirling engine through these engines suitably.

The present invention has been made in view of the above problems and has an object of providing a cooling system capable of passing the cooling medium common to the internal combustion engine and the stirling engine through these engines suitably.

Means for Solving the Problems

The present invention is a cooling system comprising: an internal combustion engine through which a cooling medium is passed; a pump that pumps the cooling medium to the internal combustion engine; a radiator that cools the cooling medium passing through the internal combustion engine; a main passage section that passes the cooling medium through the internal combustion engine from the radiator via the pump; a stirling engine through which the cooling medium is passed; a branch passage section that branches from the main passage section at a first connection point and joins a downstream part of the main passage section from the first connection point at a second connection point; and a resistance part that functions as a resistance to the flow of the cooling medium passing through the main passage section, the first connection point and the second connection point being provided in a part of the main passage section between the radiator and the pump, and the resistance part being provided in another part of the main passage section between the first connection point and the second connection point.

The present invention may be configured to further comprise a bypass passage section through which the cooling medium passing through the internal combustion engine is passed so as to bypasses the radiator, wherein the resistance part is a thermostat with a bypass valve capable of adjusting a temperature of the cooling medium passed through the internal combustion engine by adjusting a ratio of a flow rate of the cooling medium between a case where the cooling medium is passed through the radiator and another case where the cooling medium is passed through the bypass passage section.

The present invention may be configured so that the resistance part is a variable throttle valve capable of changing a degree of reduction of the flow rate of the cooling medium passing through.

The present invention may be configured so that a cross-sectional area of a passage formed by the branch passage section is set smaller than a cross-sectional area of a passage formed by the main passage section.

The present invention may be configured to further comprise a flow rate ratio changing part that includes the resistance part and is capable of changing a ratio of the flow rate of the cooling medium passed through the internal combustion engine and the flow rate of the cooling medium passed through the stirling engine.

Effects of the Invention

According to the present invention, it is possible to pass the common cooling medium flow through the internal combustion engine and the stirling engine suitably.

MODES FOR CARRYING OUT THE INVENTION

Embodiments of the invention are now described in conjunction with the drawings.

Embodiment 1

Figure 1:
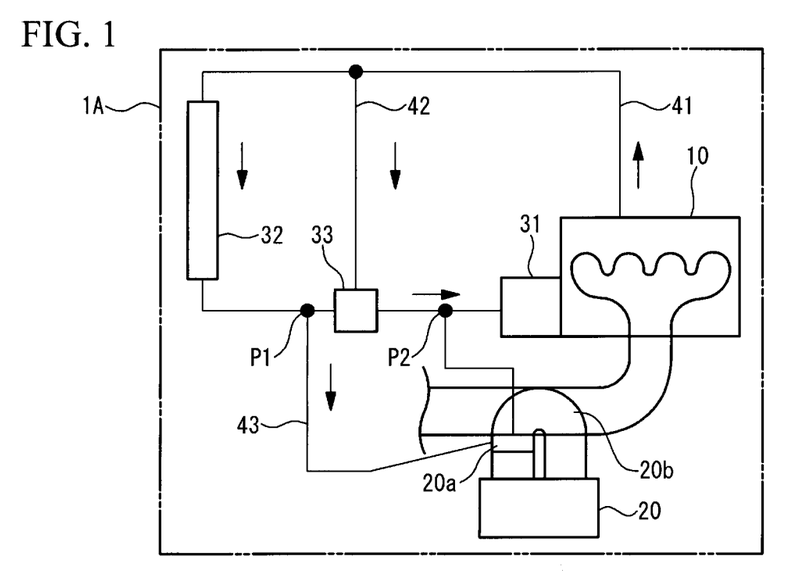
FIG. 1 is a schematic diagram of a structure of a cooling system in accordance with Embodiment 1.

FIG. 1 is a schematic diagram of a structure of a cooling system 1A. The cooling system 1A includes an internal combustion engine 10, a stirling engine 20, a pump 31, a radiator 32, and a thermostat 33. Further, the cooling system 1A includes a main passage section 41, a bypass passage section 42, and a branch passage section 43. The passage sections 41, 42 and 43 may be pipes and form passages through which coolant that is a cooling medium is passed. Arrows indicated along the passage sections 41, 42 and 43 are flow directions of the coolant.

The internal combustion engine 10 is a water cooled internal combustion engine and passes the coolant through these engines. The pump 31 pumps the coolant. The radiator 32 performs heat exchange between the passing coolant and air, and thus cools the coolant. The thermostat 33 adjusts the temperature of the coolant passed through the internal combustion engine 10. The thermostat 33 is a mechanical valve that works in accordance with the temperature of the coolant.

The internal combustion engine 10, the pump 31, the radiator 32 and the thermostat 33 are provided in the main passage section 41. The main passage section 41 forms a circulation passage that passes the coolant pumped by the pump 31 through the internal combustion engine 10, the radiator 32 and the thermostat 33 in this order before returning to the pump 31.

Therefore, the pump 31 pumps the coolant to the internal combustion engine 10. The radiator 32 cools the coolant that has been passed through the internal combustion engine 10. The main passage section 41 passes the coolant to the internal combustion engine 10 from the radiator 32 through the pump 31. The pump 31 is provided in the internal combustion engine 10, and is a mechanical pump driven by power of the internal combustion engine 10. The pump 31 may be an electric pump.

The bypass passage section 42 is provided to the main passage section 41. The bypass passage section 42 is a passage that bypasses the radiator 32. Thus, the bypass passage section 42 passes the coolant that has been passed through the internal combustion engine 10 so as to bypass the radiator 32.

The thermostat 33 is provided at a joining point where the main passage section 41 and the bypass passage section 42 join each other. Specifically, the thermostat 33 is a thermostat with a bypass valve capable of adjusting the temperature of the coolant passed through the internal combustion engine 10 by adjusting the ratio of the flow rate of the coolant between a case where the coolant is passed through the radiator 32 and another case where the coolant is passed through the bypass passage section 42.

In the adjustment of the ratio of the flow rate of the coolant, the thermostat 33 operates to prevent the coolant from being passed through the radiator 32 until the warm-up of the internal combustion engine 10 is completed after cold start, that is, until the temperature of the coolant rises to an appropriate temperature (for example, 80° C.) after cold start. After the completion of the warm-up, the thermostat 33 operates to increase the ratio of the flow rate of the coolant passed through the radiator 32 as the temperature of the coolant passed through the internal combustion engine 10 rises (for example, as the load on the internal combustion engine 10 becomes higher). The thermostat 33 may operate to pass only a small amount of the coolant through the radiator 32 until the warm-up of the internal combustion engine 10 is completed after the cold start.

The branch passage section 43 is provided to the main passage section 41. The branch passage section 43 is provided so that the stirling engine 20 is provided in the branch passage section 43. The cross section of the passage formed by the branch passage section 43 is set smaller than that of the passage formed by main passage section 41. Specifically, the diameter of the passage formed by the branch passage section 43 is set smaller than that of the passage formed by the main passage section 41.

The branch passage section 43 branches from the main passage section 41 at a first connection point P1 in the main passage section 41, and joins the main passage section 41 at a second connection point P2 that is a downstream part of the main passage section 41 from the first connection point P1. The branch passage section 43 branches from the main passage section 41 at the first connection point P1, so that the coolant cooled by the radiator 32 can be passed directly.

The connection points P1 and P2 are provided in a section of the main passage section 41 between the radiator 32 and the pump 31. The thermostat 33 is provided in the main passage section 41 so as to be interposed between the connection points P1 and P2. The thermostat 33 provided as described above corresponds to a resistance part that functions as a resistance to the flow of the coolant that passes through the main passage section 41.

The stirling engine 20 is equipped with a cooler 20a and a heater 20b. The stirling engine 20 passes the coolant. More particularly, the coolant is passed through the cooler 20a. The cooler 20a exchanges heat between the coolant and the working fluid, and cools the working fluid. The heater 20b exchanges heat between the working fluid and exhaust gas of the internal combustion engine 10, and heats the working fluid.

In the stirling engine 20, the coolant serves as a low-temperature heat source of the stirling engine 20, and the exhaust gas serves as a high-temperature heat source of the stirling engine 20. As the temperature of the coolant that passes through the cooler 20a is decreased, the temperature difference between the low-temperature heat source and the high-temperature heat source is increased. Therefore, the output of the stirling engine 20 can be increased by decreasing the temperature of the coolant that passes through the cooler 20a.

A description is now given of functions and effects of the cooling system 1A. The cooling system 1A is configured to have the connection points P1 and P2 in the section of the main passage section 41 between the radiator 32 and the pump 31. The thermostat 33 that functions as the flow resistance in the section of the main passage section 41 between the connection points P1 and P2. The branch passage section 43 branches at the connection point P1.

Thus, the cooling system 1A is capable of developing a pressure difference between the connection points P1 and P2 only by the operation of the pump 31. It is thus possible to pass the coolant through the branch passage section 43. The cooling system 1A is capable of passing the coolant that is in a state having the lowest temperature among the coolant passing through the cooling system 1A through the stirling engine 20. Since the cooling system 1A is capable of ensuring effective cooling of the stirling engine 20, the cooling system 1A is capable of suitably passing the common coolant through the internal combustion engine 10 and the stirling engine 20.

The cooling system 1A uses, as a resistance part, the thermostat 33, which is generally used for adjustment of the coolant passed through the internal combustion engine 10. Therefore, the cooling system 1A has an advantageous structure from the viewpoint of cost, so that the cooling system 1A can pass the coolant suitably.

In the cooling system 1A, the ratio of the flow rate of the coolant is adjusted between the case where the thermostat 33 passes the coolant through the radiator 32 and the case where the coolant is caused to bypass the radiator 32. In this regard, the thermostat 33 prevents the coolant from passing through the radiator 32 until the warm-up of the internal combustion engine 10 is completed. Thus, the radiator is capable of suitably passing the coolant because the cooling system 1A is capable of ensuring the effective cooling of the stirling engine 20 and accelerating the warm-up of the internal combustion engine 10.

In the cooling system 1A, the ratio of the flow rate of the coolant passed through the radiator 32 is increased as the temperature of the coolant passed through the internal combustion engine 10 after completion of warm-up rises. Thus, the thermostat 33 functions as a relatively small flow resistance.

Thus, the cooling system 1A is capable of suitably cooling the internal combustion engine 10 in a case where there is a high necessity of cooling the internal combustion engine 10. Further, a reserve capacity cools the stirling engine 20. Thus, in the case where there is a high necessity of cooling the internal combustion engine 10, the cooling system 1A is capable of suitably passing the coolant to surely cool the internal combustion engine 10 and simultaneously cool the stirling engine 20.

In the cooling system 1A, the cross-sectional area of the passage formed by the branch passage section 43 is made smaller than the cross-sectional area of the passage formed by the main passage section 41. Thus, the cooling system 1A is capable of preferentially passing the coolant through the internal combustion engine 10 under the condition that the coolant is passed through the internal combustion engine 10 and the stirling engine 20. As a result, in the case where there is a high necessity of cooling the internal combustion engine 10, the cooling system 1A is capable of suitably passing the coolant to ensure the cooling of the internal combustion engine 10.

The thermostat 33 may be an electrically controlled valve. In this case, there is further provided an electronic control unit that controls the operation of the thermostat 33 similarly as described above on the basis of, for example, the coolant temperature and the load of the internal combustion engine 10, and similar functions and effects can be obtained. This holds true for the following embodiments.

Embodiment 2

Figure 2:
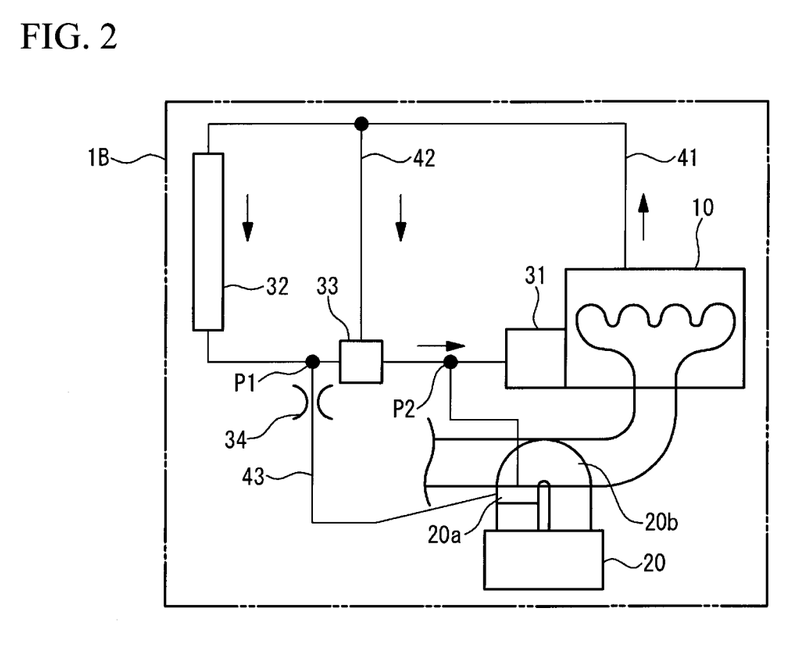
FIG. 2 is a schematic diagram of a structure of a cooling system in accordance with Embodiment 2.

FIG. 2 is a schematic diagram of a structure of a cooling system 1B. The cooling system 1B is substantially the same as the cooling system 1A except that there is further provided a throttle valve 34. The throttle valve 34 is provided in the branch passage section 43. Specifically, the throttle valve 34 is provided in a part of the branch passage section 43 located at the upstream side of the stirling engine 20. The throttle valve 34 reduces the flow rate of the coolant that passes through the branch passage section 43, as compared with a case where the throttle valve 34 is not provided by reducing the flow rate of the coolant that passes through the throttle valve 34.

A description is now given of functions and effects of the cooling system 1B. In an exemplary case where the internal combustion engine 10 has a small load after completion of warm-up, the internal combustion engine 10 may be cooled suitably as described below by causing the thermostat 33 to function as a relatively large flow resistance. That is, the ratio of the flow rate of the coolant passing through the radiator 32 is relatively reduced to mix the coolant passing through the radiator 32 and the coolant passing through the bypass passage section 42, whereby the internal combustion engine 10 may be cooled suitably.

However, in this case, when the branch passage section 43 has a small flow resistance, the coolant may pass through the radiator 32 at a flow rate higher than the flow rate limited by the thermostat 33, and may flow into the branch passage section 43. Then, the coolant flowing into the branch passage section 43 reaches the internal combustion engine 10, which may be excessively cooled.

In contrast, the cooling system 1B is configured to reduce the flow rate of the coolant that passes through the branch passage section 43 by the throttle valve 34. This makes it possible to prevent the internal combustion engine 10 from being excessively cooled even in a case where the thermostat 33 functions as a relatively large flow resistance. Thus, as compared with the cooling system 1A, the cooling system 1B is capable of suitably passing the coolant through the internal combustion engine 10 and the stirling engine 20 to suitably cool the internal combustion engine 10 in the case where the thermostat 33 functions as a relatively large flow resistance.

Embodiment 3

Figure 3:
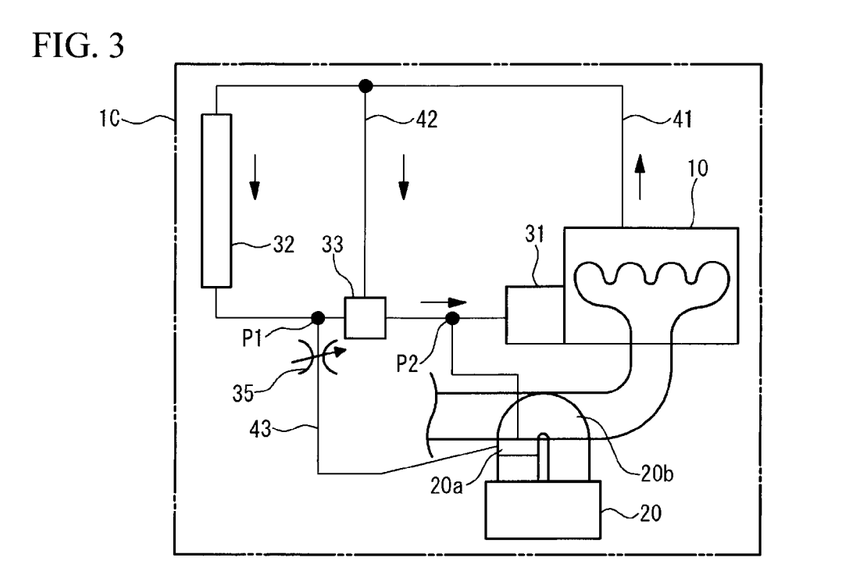
FIG. 3 is a schematic diagram of a structure of a cooling system in accordance with Embodiment 3.

FIG. 3 is a schematic diagram of a structure of a cooling system 1C. The cooling system 1C is substantially the same as the cooling system 1B except that a variable throttle valve 35 is substituted for the throttle valve 34. The variable throttle valve 35 is provided in the branch passage section 43 like the throttle valve 34. The variable throttle valve 35 changes the degree of reduction of the flow rate of the passing coolant. In this regard, the variable throttle valve 35 is a mechanical valve that operates in response to the pressure of the coolant. The variable throttle valve 35 may be a mechanical valve that operates in response to the temperature of the coolant.

The variable throttle valve 35 is operated to change the degree of reduction of the flow rate of the passing coolant by increasing the amount of opening as the thermostat 33 functions as a relatively smaller flow resistance.

Figure 4:
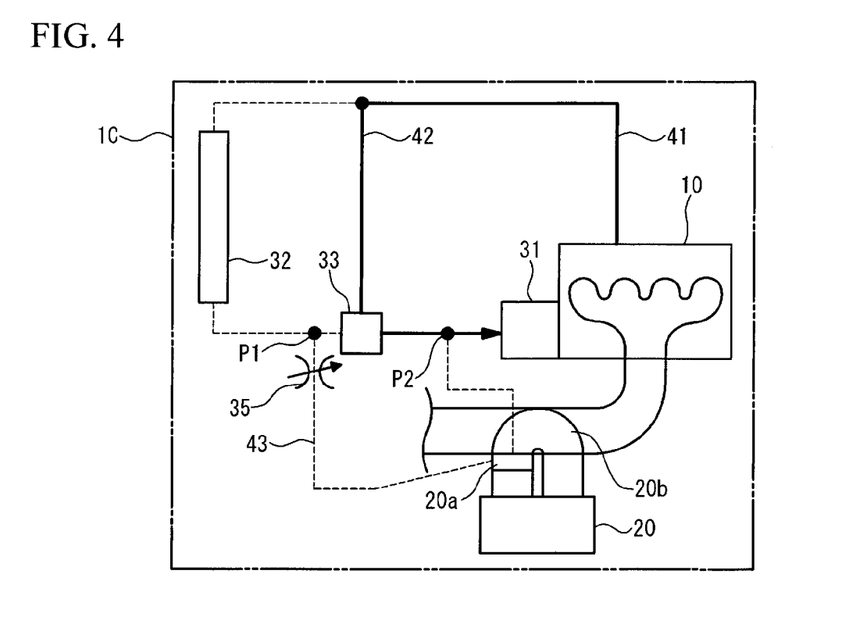
FIG. 4 is a diagram of a first flow mode of coolant.
Figure 5:
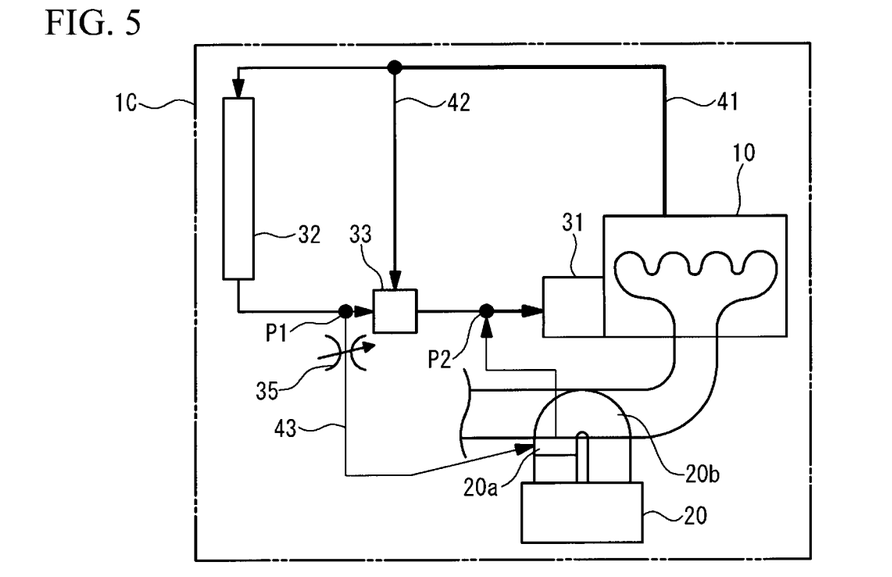
FIG. 5 is a diagram of a second flow mode of coolant.
Figure 6:
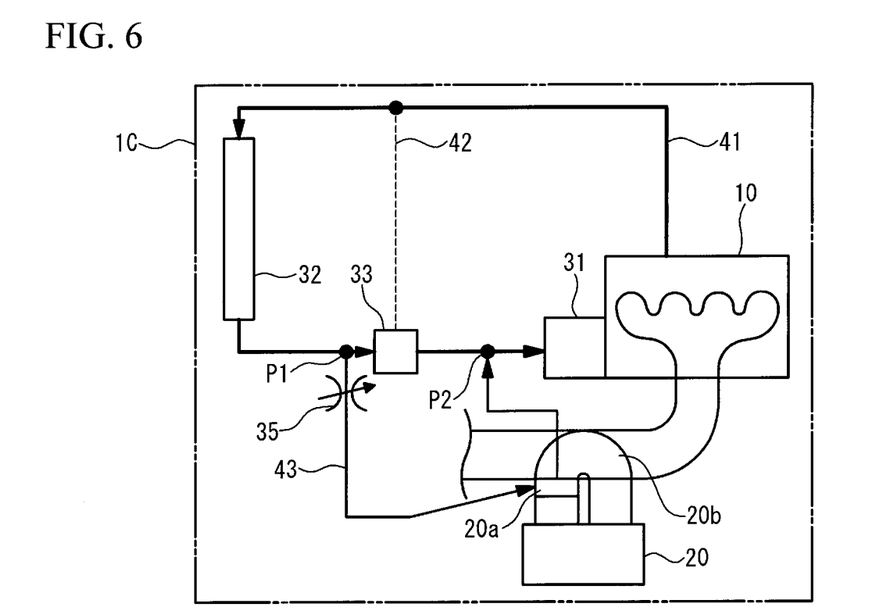
FIG. 6 is a diagram of a third flow mode of coolant.

FIG. 4 is a diagram illustrating a first flow mode of the coolant. FIG. 5 is a diagram illustrating a second flow mode of the coolant. FIG. 6 is a diagram illustrating a third flow mode of the coolant. FIG. 4 illustrates a flow mode in a case where the engine is cold, FIG. 5 illustrates a flow mode in a case where the internal combustion engine 10 is at light/middle loads. FIG. 6 illustrates a flow mode in a case where the internal combustion engine 10 is at high loads. In FIGS. 4, 5 and 6, arrows illustrated so as to overlay the main passage sections 41, the bypass passage sections 42 or the branch passage sections 43 indicate the flows of the coolant. The thickness of each arrow indicates the magnitude of the flow rate. Broken lines that show the main passage sections 41, the bypass passage sections 42 and the branch passage sections 43 indicate states in which the coolant does not flow.

As illustrated in FIG. 4, the coolant discharged from the pump 31 in the engine cold state passes through the internal combustion engine 10, and flows in the main passage section 41. All the coolant that passes through the main passage section 41 flows in the bypass passage section 42 on the way. The coolant that has flown into the bypass passage section 42 flows in the main passage section 41 again via the thermostat 33, and returns to the pump 31. Thus, at that time, the coolant does not pass through the radiator 32. Further, the coolant does not flow through the branch passage section 43 and the stirling engine 20. At this time, as has been described previously, only a small amount of coolant may be passed through the radiator 32.

As illustrated in FIG. 5, in the case where the internal combustion engine 10 is at light/middle loads, the coolant discharged from the pump 31 passes through the internal combustion engine 10, and then flows in the main passage section 41. Then, some of the coolant passing through the main passage section 41 separately flows into the bypass passage section 42 on the way. The coolant that flows into the bypass passage section 42 flows into the main passage section 41 again via the thermostat 33, and returns to the pump 31.

Meanwhile, the coolant that does not flow into the bypass passage section 42 passes through the radiator 32. After that, some of the coolant flows into the branch passage section 43 separately. The coolant that does not flow into the branch passage section 43 separately returns to the pump 31 via the thermostat 33. In contrast, the coolant that flows into the branch passage section 43 separately passes through the variable throttle valve 35 and the stirling engine 20, and returns to the main passage section 41 before returning to the pump 31. At this time, the variable throttle valve 35 opens the valve with a relatively small amount of opening in order to prevent the coolant from excessively passing through the stirling engine 20.

As illustrated in FIG. 6, in a case where the internal combustion engine 10 is at high loads such as full load, the coolant discharged from the pump 31 passes through the internal combustion engine 10 and then passes through the main passage section 41. All the coolant flows into the radiator 32 without flowing in the bypass passage section 42 separately. After passing through the radiator 32, the coolant flows into the branch passage section 43 separately, and returns to the pump 31 via the thermostat 33 or the branch passage section 43. At this time, the variable throttle valve 35 opens with a relatively large amount of opening (for example, full open).

The thermostat 33 and the variable throttle valve 35 corresponds to a flow rate ratio changing unit capable of changing the ratio of the flow rate of the coolant passed through the internal combustion engine 10 and the flow rate of the coolant passed through the stirling engine 20.

Figure 7:
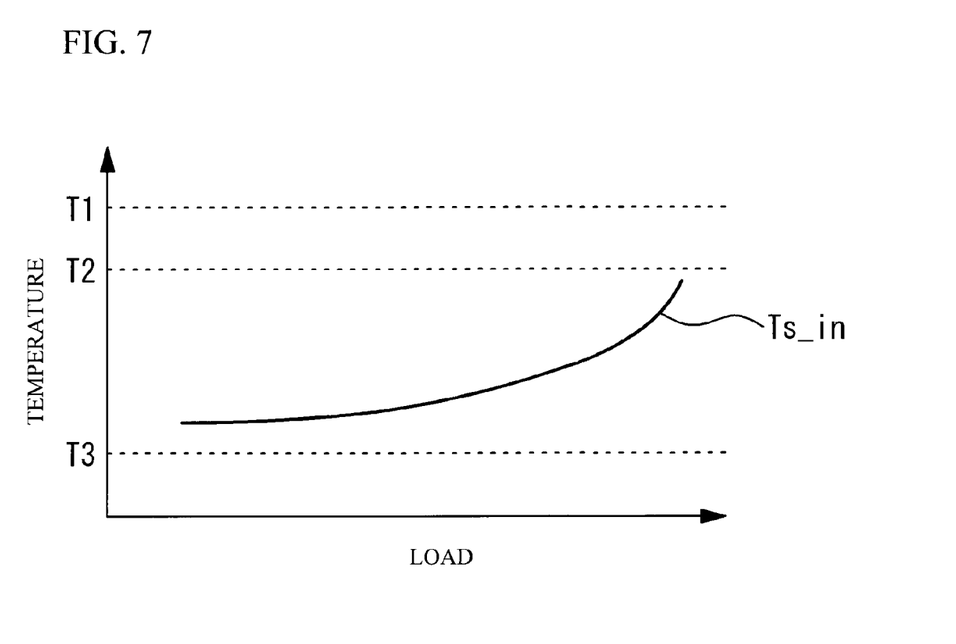
FIG. 7 is a view of a relationship between the temperature of coolant at an inlet of a stirling engine and the load of an internal combustion engine.

A description is now given of functions and effects of the cooling system 1C. FIG. 7 is a view of a relationship between the temperature Ts_in of the coolant at an inlet of the stirling engine 20 and the load of the internal combustion engine 10. In FIG. 7, temperature T1 is the coolant temperature at an inlet of the radiator 32, temperature T2 is the coolant temperature at an inlet of the internal combustion engine 10, and T3 is the ambient temperature. For example, the temperatures T1, T2 and T3 are 100° C., 80° C. and 40° C., respectively.

In the cooling system 1C, in a case where the internal combustion engine 10 is at light/middle loads, the thermostat 33 causes some of the coolant to separately flow in the bypass passage section 42, and thus reduces the flow rate of the coolant passing through the radiator 32. At this time, even in a case where the thermostat 33 functions as a relatively large flow resistance, the variable throttle valve 35 opens with a relatively small amount of opening.

Thus, in the case where the internal combustion engine 10 is at light/middle loads, the cooling system 1C is capable of cooing the coolant so as to have a large reserve capacity with respect to the cooling of the internal combustion engine 10. It is further possible to pass the coolant after cooled by the radiator 32 to through the internal combustion engine 10 and the stirling engine 20.

Thus, the coolant cooled by the radiator 32 and the coolant caused to bypasses the radiator 32 are mixed with each other and are then passed through the internal combustion engine 10, so that the temperature T2 can be set to an appropriate temperature. Also, the coolant cooled so as to have a large reserve capacity with respect to the cooling of the internal combustion engine 10 is passed through the stirling engine 20, so that the temperature Ts_in can be lowered greatly, as compared with the temperature T2.

In the cooling system 1C, in a case where the internal combustion engine 10 is at high loads, the thermostat 33 passes all the coolant through the radiator 32. At this time, even when the thermostat 33 functions as a relatively small flow resistance, the variable throttle valve 35 opens with a relatively large amount of opening.

Thus, the cooling system 1C is capable of passing the coolant through the stirling engine 20 at a flow rate higher than that at light/middle loads of the internal combustion engine 10 while preferentially passing the coolant cooled by the radiator 32 through the internal combustion engine 10. Thus, the stirling engine 20 can be cooled while preferentially cooling the internal combustion engine 10.

As described above, the cooling system 1C is capable of suitably passing the coolant through the internal combustion engine 10 and the stirling engine 20 in accordance with the operating conditions of the internal combustion engine 10, and is thus capable of suitably passing the coolant, as compared with the cooling system 1B.

The variable throttle valve 35 may be an electronic control valve. In this case, there is further provided an electronic control unit that controls the operation of the variable throttle valve 35 on the basis of the coolant temperature and the load of the internal combustion engine 10 in a manner similar to that described above, so that similar functions and effects can be obtained.

While the exemplary embodiments of the present invention have been described in detail, the present invention is not limited to the above-mentioned embodiments, but various variations and modifications may be made within the scope of the present invention.

For example, the resistance part may be a variable throttle valve. Even in this case, effective cooling of the stirling engine can be ensured. As the temperature of the coolant passed through the internal combustion engine is higher, the amount of opening is changed so as to have a higher flow rate of the passing coolant, so that the stirling engine can be cooled while ensuring the cooling of the internal combustion engine in a case having a high necessity of cooling the internal combustion engine.

| DESCRIPTION OF LETTERS OR NUMERALS | |
|---|---|
| Cooling system | 1A, 1B, 1C |
| Pump | 31 |
| Radiator | 32 |
| Thermostat | 33 |
| Main passage | 41 |
| Bypass passage | 42 |
| Branch passage | 43 |

The invention claimed is:

1. A cooling system comprising:

an internal combustion engine through which a cooling medium is passed;

a pump that pumps the cooling medium to the internal combustion engine;

a radiator that cools the cooling medium passing through the internal combustion engine;

a main passage section that passes the cooling medium through the internal combustion engine from the radiator via the pump;

a stirling engine through which the cooling medium is passed;

a branch passage section that branches from the main passage section at a first connection point and joins a downstream part of the main passage section downstream from the first connection point at a second connection point; and a resistance part that functions as a resistance to flow of the cooling medium passing through the main passage section, both the first connection point and the second connection point being provided in a part of the main passage section that is downstream from the radiator and upstream from the pump, and the resistance part being provided in another part of the main passage section that is downstream from the first connection point and upstream from the second connection point.

2. The cooling system according to claim 1, further comprising a bypass passage section through which the cooling medium passing through the internal combustion engine is passed so as to bypass the radiator, wherein the resistance part is a thermostat with a bypass valve capable of adjusting a temperature of the cooling medium passed through the internal combustion engine by adjusting a ratio of a flow rate of the cooling medium between a case where the cooling medium is passed through the radiator and another case where the cooling medium is passed through the bypass passage section.

3. The cooling system according to claim 1, wherein the resistance part is a variable throttle valve capable of changing a degree of reduction of the flow rate of the cooling medium passing through.

4. The cooling system according to claim 1, wherein a cross-sectional area of a passage formed by the branch passage section is set smaller than a cross-sectional area of a passage formed by the main passage section.

5. The cooling system according to claim 1, further comprising a flow rate ratio changing part that includes the resistance part and is capable of changing a ratio of the flow rate of the cooling medium passed through the internal combustion engine and the flow rate of the cooling medium passed through the stirling engine.

* * * * *